US009022464B2

United States Patent
Feng et al.

(10) Patent No.: US 9,022,464 B2
(45) Date of Patent: May 5, 2015

(54) HEATABLE SEAT

(71) Applicants: Tsinghua University, Beijing (CN); Hon Hai Precision Industry Co., Ltd., New Taipei (TW)

(72) Inventors: Chen Feng, Beijing (CN); Xue-Wei Guo, Beijing (CN); Li Qian, Beijing (CN); Yu-Quan Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 6 days.

(21) Appl. No.: 13/941,296

(22) Filed: Jul. 12, 2013

(65) Prior Publication Data

US 2014/0138992 A1 May 22, 2014

(30) Foreign Application Priority Data

Nov. 22, 2012 (CN) .......................... 2012 1 4772948

(51) Int. Cl.
| | |
|---|---|
| A47C 7/74 | (2006.01) |
| B60N 2/56 | (2006.01) |
| H05B 3/14 | (2006.01) |
| H05B 3/34 | (2006.01) |

(52) U.S. Cl.
CPC .............. *B60N 2/5685* (2013.01); *A47C 7/748* (2013.01); *H05B 3/145* (2013.01); *H05B 3/34* (2013.01); *H05B 3/342* (2013.01); *H05B 2203/016* (2013.01); *H05B 2203/029* (2013.01); *H05B 2214/04* (2013.01)

(58) Field of Classification Search
USPC ..................................................... 297/180.12
See application file for complete search history.

(56) References Cited

U.S. PATENT DOCUMENTS

| | | | | |
|---|---|---|---|---|
| 4,149,066 | A | * | 4/1979 | Niibe ............................ 219/505 |
| 4,258,706 | A | * | 3/1981 | Shank ................... 297/180.12 X |
| 4,523,085 | A | * | 6/1985 | Grise ............................ 219/528 |
| 6,229,123 | B1 | * | 5/2001 | Kochman et al. ............. 219/549 |
| 6,403,935 | B2 | * | 6/2002 | Kochman et al. ............. 219/545 |
| 7,196,288 | B2 | * | 3/2007 | Weiss et al. ................... 219/217 |
| 7,510,239 | B2 | * | 3/2009 | Stowe ...................... 297/180.12 |
| 7,695,062 | B2 | * | 4/2010 | Stowe ................... 297/180.12 X |
| 8,288,693 | B2 | * | 10/2012 | Weiss et al. ................... 219/541 |
| 8,456,272 | B2 | * | 6/2013 | Rauh et al. .................... 338/296 |
| 8,544,942 | B2 | * | 10/2013 | Lazanja et al. ........... 297/180.12 |
| 8,641,139 | B2 | * | 2/2014 | Gerken et al. ........... 297/180.12 |
| 8,702,164 | B2 | * | 4/2014 | Lazanja et al. .......... 297/180.12 |
| 2001/0002669 | A1 | * | 6/2001 | Kochman et al. ............. 219/545 |
| 2010/0206863 | A1 | * | 8/2010 | Ritter ............................ 219/202 |
| 2010/0326976 | A1 | * | 12/2010 | Nakajima et al. ............. 219/217 |

*Primary Examiner* — Rodney B White
(74) *Attorney, Agent, or Firm* — Novak Druce Connolly Bove + Quigg LLP

(57) ABSTRACT

A heatable seat includes a back and a bottom. At least one of the back and the bottom includes a heating pad. The heating pad includes a heating element, a number of first electrodes and a number of second electrodes. The heating element includes a flexible substrate and a carbon nanotube layer fixed on the flexible substrate. The heating element has a first end and a second end opposite to the first end. The first end is cut into a number of first strip structures. The second end is cut into a number of second strip structures. Each of the first electrodes clamps one of the first strip structures and is electrically connected with the first strip structure. Each of the second electrodes clamps one of the second strip structures and is electrically connected with the second strip structure.

20 Claims, 9 Drawing Sheets

HEATABLE SEAT

CROSS-REFERENCE TO RELATED APPLICATION

This application claims all benefits accruing under 35 U.S.C. §119 from China Patent Application No. 201210477294.8, filed on Nov. 22, 2012, in the China Intellectual Property Office, the contents of which are hereby incorporated by reference.

BACKGROUND

1. Technical Field

The present disclosure relates to a heatable seat.

2. Description of Related Art

Heatable seats are widely used in cars, buses and other vehicles. A heatable seat usually includes a seat and a heating element located in the seat. A metal high resistance wire of low tensile strength is commonly used as a heating element. However, such wires can easily break and become a hazard.

What is needed, therefore, is to provide a heatable seat which can overcome the above-described shortcomings.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
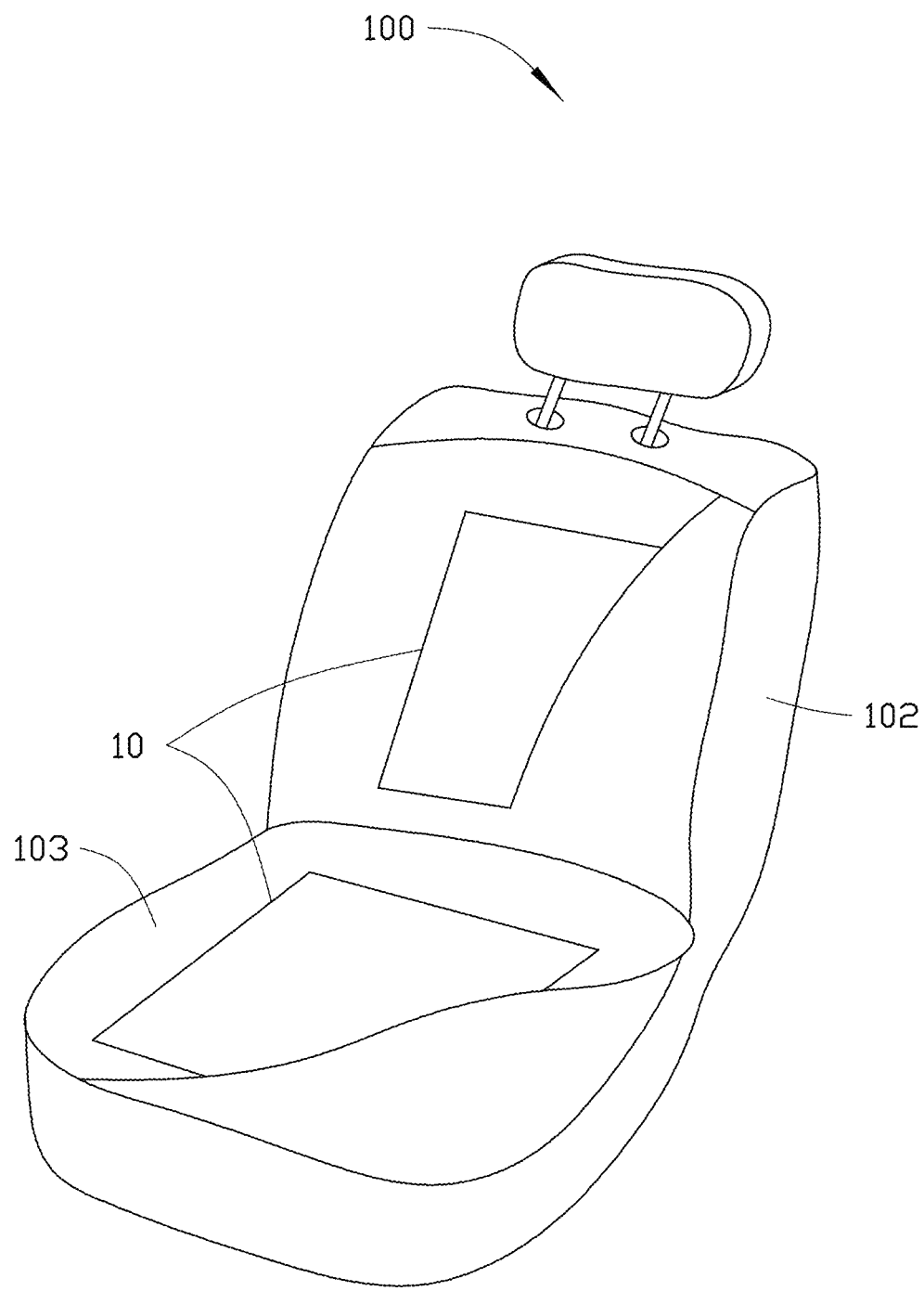
FIG. 1 shows a three-dimensional partial cross-section schematic view of one embodiment of a heatable seat.
Figure 2:
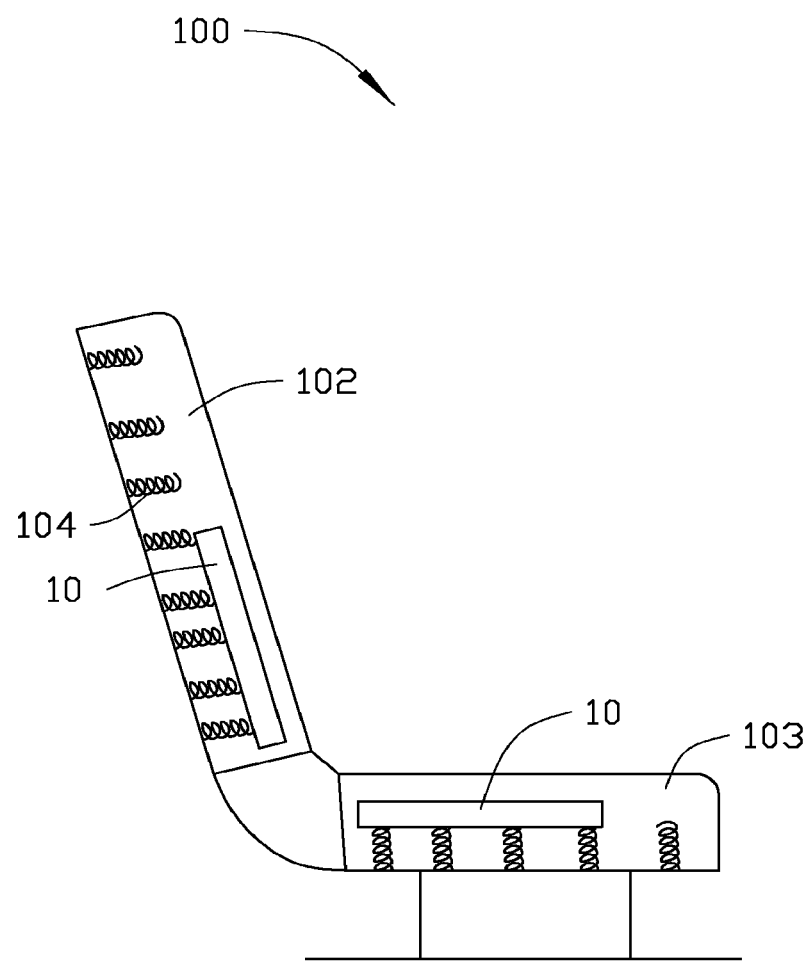
FIG. 2 shows a side cross-section schematic view of the heatable seat of the FIG. 1.

Referring to FIGS. 1 and 2, a heatable seat 100 according one embodiment is provided. The heatable seat 100 includes a back 102 and a bottom 103 connected with the back 102. The heat seat 100 further includes at least one heating pad 10 located inside it. The at least one heating pad 10 can be located in the back 102 or the bottom 103. In some embodiments, the heatable seat 100 can include a plurality of heating pads 10 separately located in the back 102 and bottom 103. In the embodiment according to FIGS. 1 and 2, the heatable seat 100 includes two heating pads 10. One heating pad 10 is located in the back 102, the other one is located in the bottom 103.

The back 102 and the bottom 103 both include an outer layer and a filling layer. The filling layer is filled in the outer layer. A material of the outer layer can be leather or cloth. A material of the filling layer can be sponge, cotton, silicon rubber, cloth, or feathers. Referring to FIG. 2, the heatable seat 100 can further include a plurality of springs 104 located inside the heatable seat 100. The heating pad 10 can be located between the outer layer and the filling layer. In other embodiments, the heating pad 10 can be located in the filling layer. The heating pad 10 can be fixed by adhesive or mechanical method.

Figure 3:
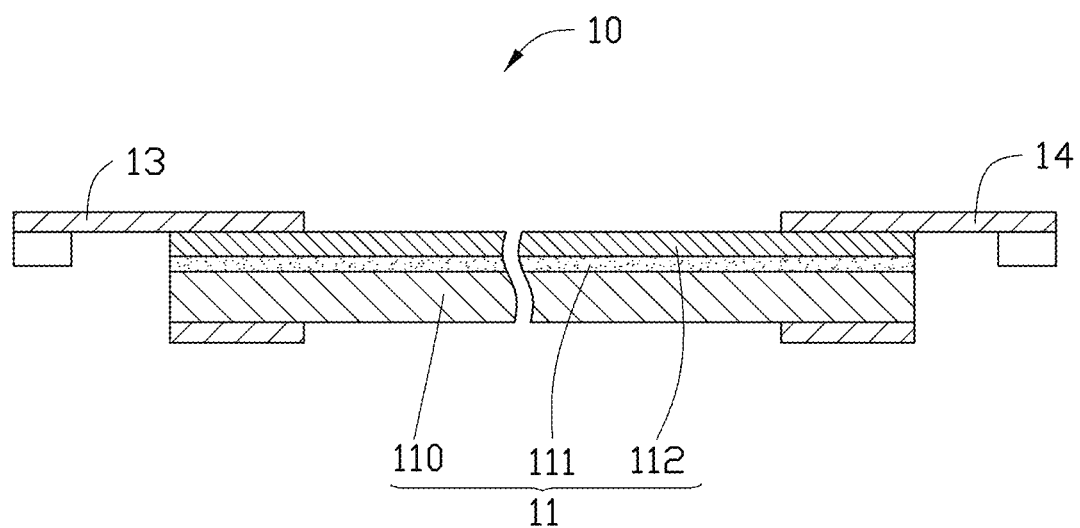
FIG. 3 shows a cross-section, schematic view of one embodiment of a heating pad used in the heatable seat of FIG. 1.
Figure 4:
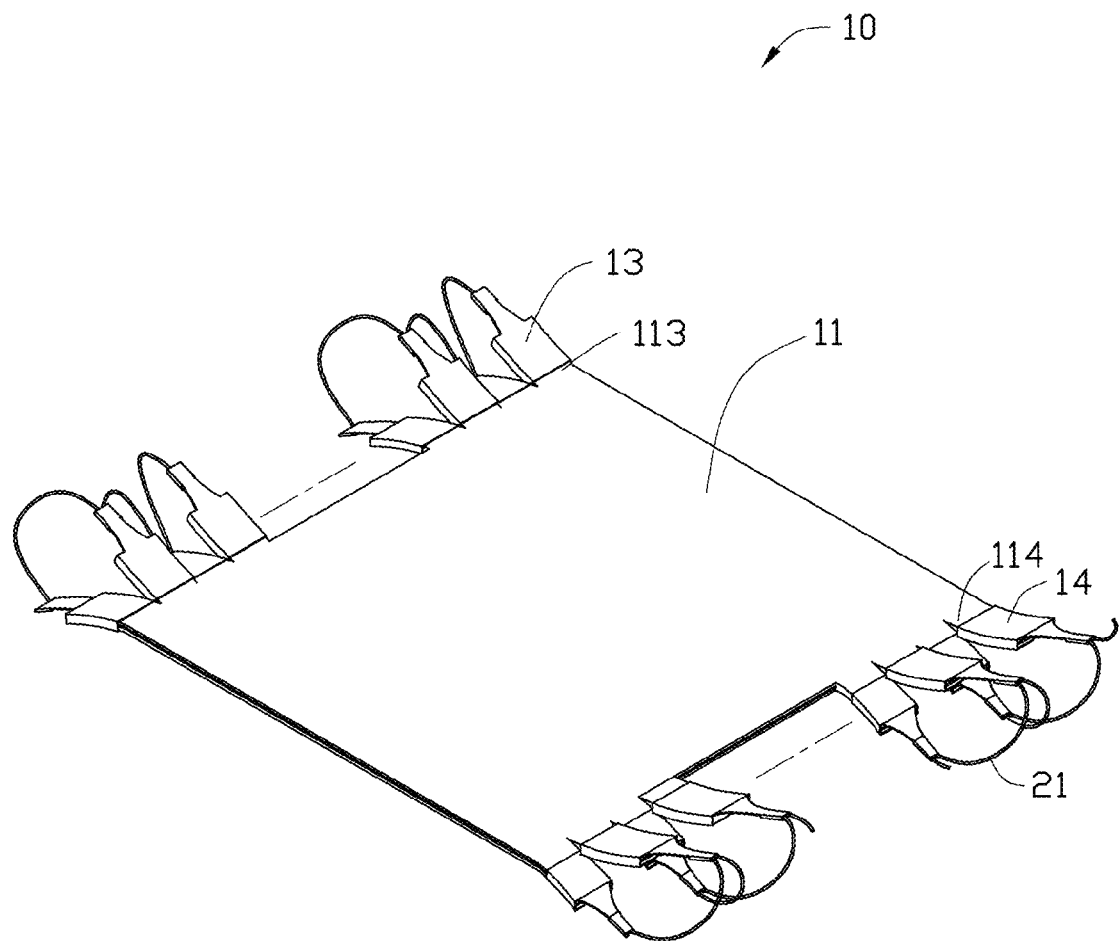
FIG. 4 shows a partial three-dimensional schematic view of the heating pad of the FIG. 3.

FIGS. 3 and 4 show one embodiment of a heating pad 10 including a heating element 11, a plurality of first electrodes 13 electrically connected with each other and a plurality of second electrodes 14 electrically connected with each other. The heating element 11 includes a flexible substrate 110, an adhesive layer 111 disposed on the flexible substrate 110, and a carbon nanotube layer 112 stuck on the flexible substrate 110 by the adhesive layer 111. The heating element 11 has a first end (not labeled) and a second end (not labeled) opposite to the first end. The first end is divided into a plurality of first strip structures 113. Each of the first electrodes 13 clamps and is electrically connected with one of the first strip structures 113. The second end is divided into a plurality of second strip structures 114. Each of the second electrodes 14 clamps and is electrically connected with one of the second strip structures 114.

A material of the flexible substrate 110 can be a flexible insulating material having an excellent ductility and a high strength, such as silica gel, polrvinyl chloride (PVC), polytetrafluoroethylene (PTFE), non-woven fabric, polyurethane (PU), or corium. In one embodiment, the flexible substrate 110 is a rectangle shaped PU substrate having a length of about 40 centimeters (cm) and a width of about 30 cm.

In one embodiment, the adhesive layer 111 is a silica gel layer. The carbon nanotube layer 112 is adhered on a surface of the flexible substrate 110 by the silica gel layer. The silica gel in the adhesive layer 111 is infiltrated between the adjacent carbon nanotubes in the carbon nanotube layer 112.

The carbon nanotube layer 112 includes at least one carbon nanotube film. In one embodiment, the carbon nanotube layer 112 includes more than one carbon nanotube films, such as 10 to 1000 carbon nanotube films stacked with each other. In one embodiment, the carbon nanotube layer 112 comprises two hundreds carbon nanotube films 12 stacked with each other and combined with each other by van der Waals attractive force. An angle $\alpha$ between the carbon nanotubes in the adjacent carbon nanotube films can be in a range from about 0 degrees to about 90 degrees. In one embodiment, the angle $\alpha$ is 0 degrees, namely the carbon nanotubes in the adjacent carbon nanotube films are aligned along a substantially same direction, and an extend direction of the carbon nanotubes in the carbon nanotube layer 112 is the same as a length direction of the flexible substrate 110.

Figure 5:
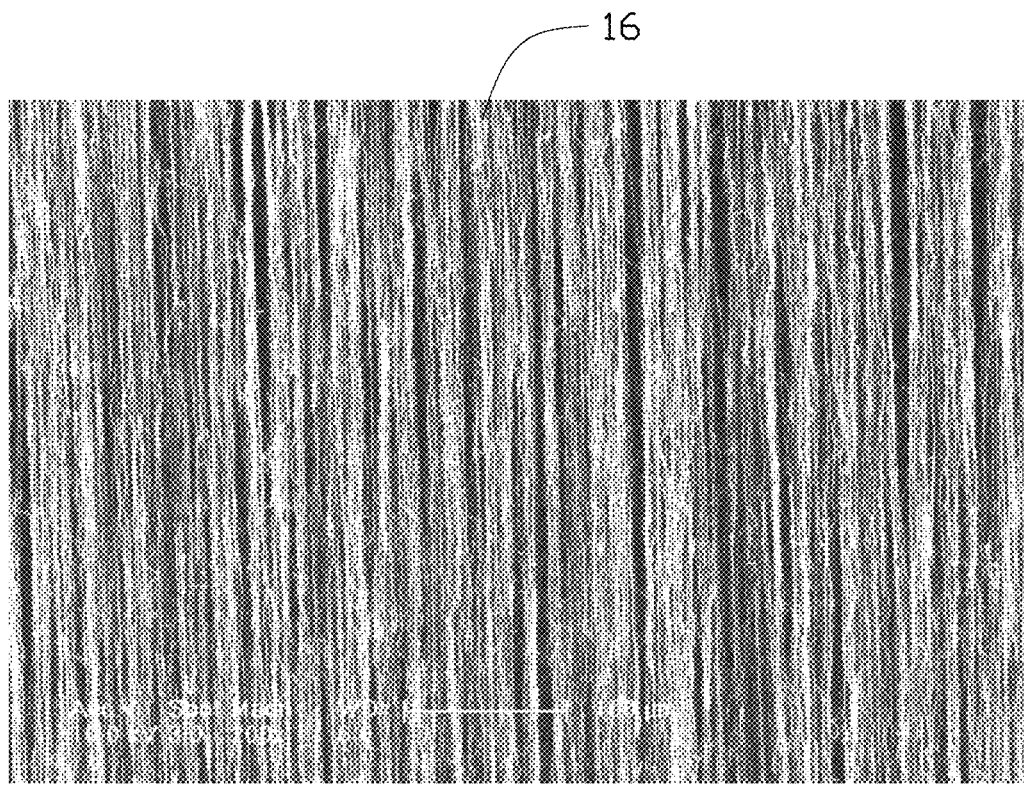
FIG. 5 shows a scanning electron microscopic image of a carbon nanotube film used in the heating pad of the FIG. 3.

Referring to FIG. 5, the carbon nanotube film 16 is a free-standing structure. A large number of the carbon nanotubes in the carbon nanotube film can be oriented along a preferred orientation, meaning that a large number of the carbon nanotubes in the carbon nanotube film 16 are arranged substantially along the same direction. The arranged orientations of a large number of the carbon nanotubes are substantially parallel to the surface of the carbon nanotube film 16. An end of one carbon nanotube is joined to another end of an adjacent carbon nanotube arranged substantially along the same direction by van der Waals attractive force. A small number of the carbon nanotubes are randomly arranged in the carbon nanotube film 16, and has a small if not negligible effect on the larger number of the carbon nanotubes in the carbon nanotube film 16 arranged substantially along the same direction. The carbon nanotube film is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. So, if the carbon nanotube film 16 is placed between two separate supporters, a portion of the carbon nanotube film 16, not in contact with the two supporters, would be suspended between the two supporters and yet maintain film structural integrity. The free-standing structure of the carbon nanotube film 16 is realized by the successive carbon nanotubes joined end to end by van der Waals attractive force. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded. More specifically, the carbon nanotube film 16 includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotubes in the carbon nanotube film 16 are also substantially oriented along a preferred orientation.

The carbon nanotube film 16 has a great specific surface area, and there is no amorphous carbon and residual metal catalyst particles in the carbon nanotube film 16. Thus, the carbon nanotube layer 112 has a high viscosity, and the carbon nanotube layer 112 can be stuck on the flexible substrate 110 by the viscosity of the carbon nanotube layer 112 itself. Thus, the adhesive layer 111 is optional. The flexible substrate 110 and the carbon nanotube layer 112 are overlapped with each other.

The heating element 11 has the first end and the second end opposite to the first end. A direction from the first end to the second end is along a length direction of the heating element 11. In one embodiment, the first end is cut into 43 first strip structures 113 along a direction substantially parallel to the length direction of the heating element 11. The second end is cut into 43 second strip structures 114 along a direction substantially parallel to the length direction of the heating element 11. Thus, the first end and the second end are both divided into a plurality of parts separated from each other and all connected to the main body of the heating element 11. The first and second strip structures 113, 114 are belonged to the heating element 11. A width of the first strip structures 113 and the second strip structures 114 can be about 7 millimeters, and a length of the first strip structures 113 and the second strip structures 114 can be about 10 mm.

An end of an insert spring is fixed on one of the strip structures 113, 114 by a spring sheet. A conductive wire 21 is disposed on another end of the insert spring and clapped by the spring sheet. The insert springs fixed on the first strip structures 113 are electrically connected with each other by the conductive wires 21. The insert springs fixed on the second strip structures 114 are electrically connected with each other by the conductive wires 21. The insert springs can be used as the electrodes. Thus, a plurality of first electrodes 13 are electrically connected with one end of the heating element 11, and a plurality of second electrodes are electrically connected with another end of the heating element 11. A contact resistance between the electrodes and the carbon nanotube layer 112 is less than or equal to 0.3 Ohms. In one embodiment, the contact resistance is 0.1 Ohms. The carbon nanotubes in the heating pad 10 are joined with each other end to end by van der Waals attractive force such that, the carbon nanotubes are jointly extend from the first electrodes 13 to the second electrodes 14. In one embodiment, the carbon nanotubes in the heating pad 10 are aligned along an aligned direction of the first electrodes 13 and the second electrodes 14. Specifically, the first electrodes 13 and the second electrodes 14 are connected with the carbon nanotubes along a diameter direction of the carbon nanotubes.

The strip structures of each end of the heating element 11 can be arranged with no gaps therebetween along a direction perpendicular to the length direction of the heating element 11. In one embodiment, the plurality of first electrodes 13 are separated from each other along a thickness direction of the heating element 11, and the plurality of second electrodes 14 are separated from each other along a thickness direction of the heating element 11. Some or all of the first and second electrodes 13, 14 can be diverged from the plane of the heating element 11.

Figure 6:
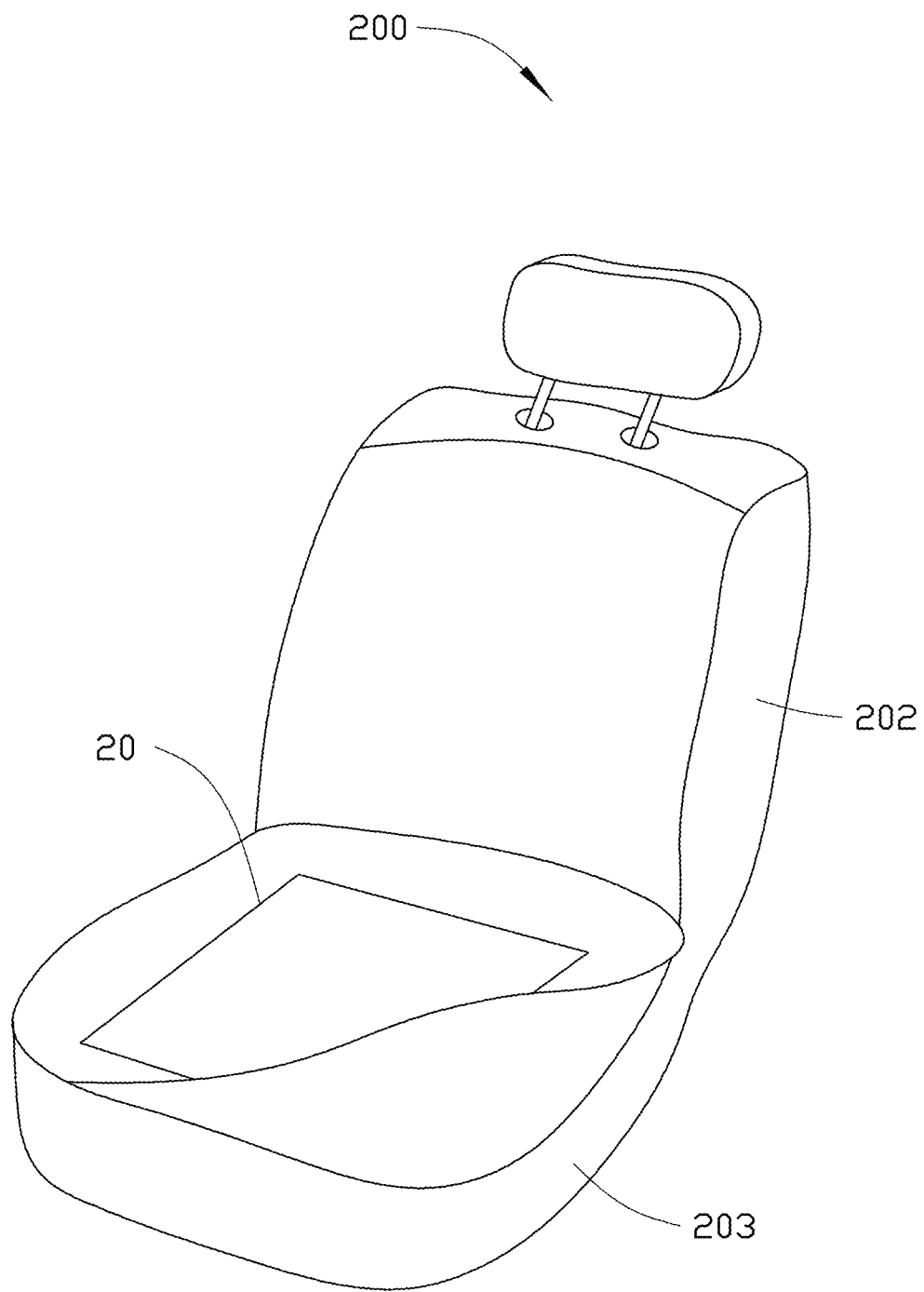
FIG. 6 shows a partial three-dimensional cross-section schematic view of another embodiment of a heatable seat.
Figure 7:
FIG. 7 is a photo of a surface of a carbon nanotube layer in another embodiment of a heating pad.
Figure 8:
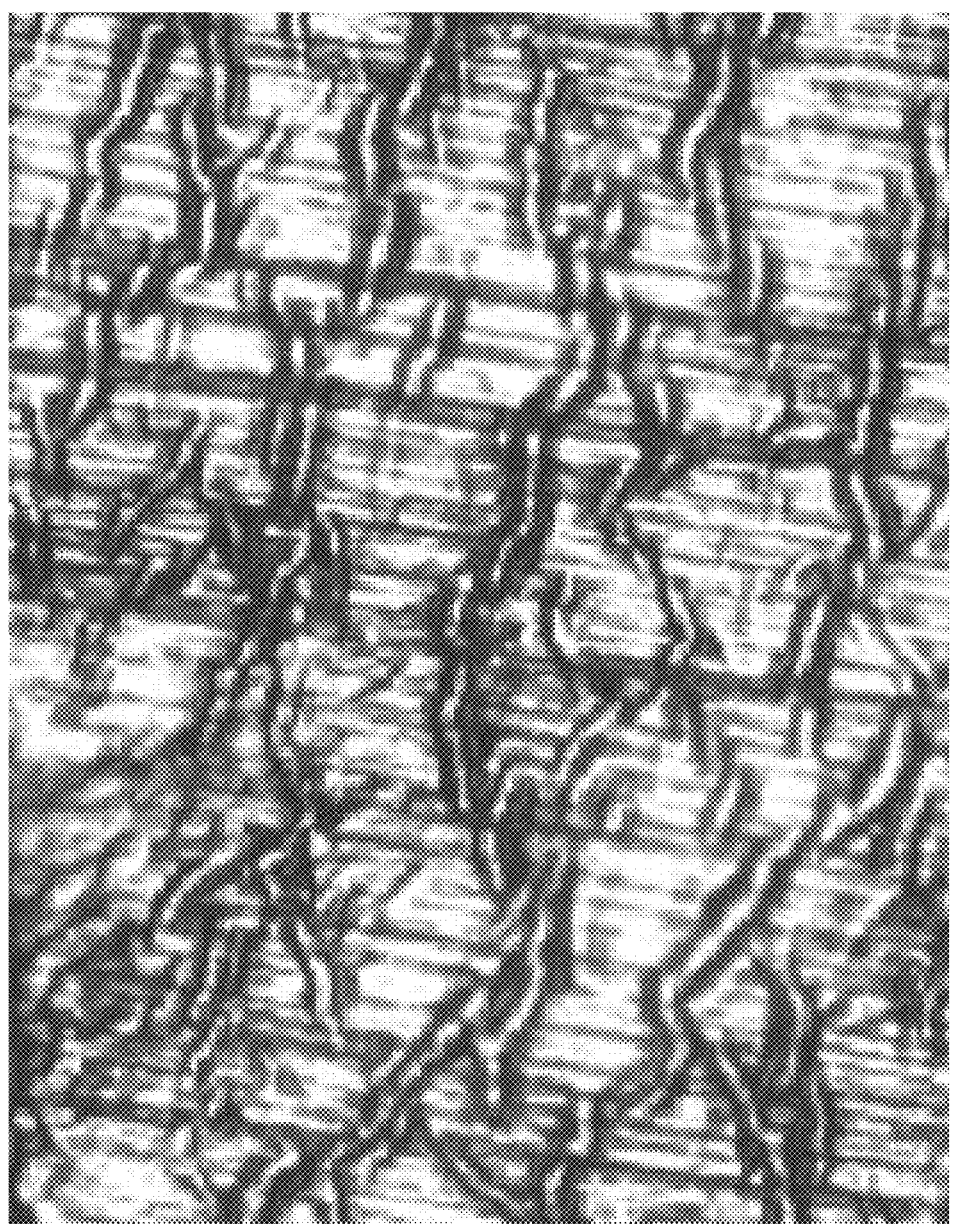
FIG. 8 is an optical microscopic image of the side surface of the carbon nanotube layer of FIG. 7.

Referring to FIG. 6, a heatable seat 200 according to another embodiment is provided. The heatable seat 200 includes a heating pad 20 located therein. The heating pad 20 includes a heating element (not shown). The heating element includes a carbon nanotube layer having structure shown in FIGS. 7 and 8. Referring to FIGS. 7 and 8, the carbon nanotubes in the carbon nanotube layer bend along a normal direction of the carbon nanotube layer and form a plurality of protuberances. Namely, in a single carbon nanotube, portions of the carbon nanotube are higher than other portions of the carbon nanotube. Macroscopically, the carbon nanotube layer includes a plurality of wrinkles due to the protuberances of the carbon nanotubes. An extending direction of the wrinkles can be crossed with the extending direction of the carbon nanotubes in the carbon nanotube layer. In one embodiment, the extending direction of the wrinkles is substantially perpendicular to the length direction of the carbon nanotubes. The carbon nanotube layer has a drawing margin in the length direction of the carbon nanotubes. A resistance of the heating element in the extend direction of the carbon nanotube is about 5.4 Ohms. If the carbon nanotube layer is drawn along the length direction of the carbon nanotubes, the carbon nanotube layer cannot easily break. In addition, the carbon nanotube layer has an excellent tensile strength in the direction substantially perpendicular to the extending direction of the carbon nanotubes. Thus, the heating element has a high tensile strength, a bending resistance performance and a high mechanical strength. As such, the heating pad 20 can be flexible and stretched without being destroyed. The heatable seat 200 including the heating pad 20 can have a long life.

Other characteristics of the heatable seat 200 are the same as the heatable seat 100.

In use of the heatable seat 200, a voltage of 56.4 V and a current of 10.16 A are applied to the heating pad in the heatable seat 200, and a temperature of the heating pad rises. A temperature test was applied to the heating pad. The test results are as follows:

TABLE 1

| Conduction period | A temperature difference between the heating pad and the circumstance |
| --- | --- |
| 15 s | 16° C. |
| 30 s | 31° C. |
| 60 s | 62° C. |

The carbon nanotubes in the carbon nanotube layer have an excellent conductivity along an axis direction of the carbon nanotubes. The resistance of the heating element in the length direction of the carbon nanotubes is about 5.4 Ohm. A contact resistance between the electrodes and the heating element is about 0.1 Ohm. Thus, a temperature of the heating pad can be rapidly risen within a short period. Thus, the heating pad can rapidly heat other substance under a certain power.

In another embodiment, a heat insulating property of the heating pad is tested under a small power input. A voltage of 12 V and a current of 2.18 A is applied on the heating pad. A conduction period and a temperature of the heating pad are tested under a room temperature of 26.4° C. The results are shown as follows:

TABLE 2

| Conduction period | Temperature of the heating pad |
| --- | --- |
| 0 s | 26.4° C. |
| 30 s | 27.7° C. |
| 60 s | 29.2° C. |
| 1 min 30 s | 30.7° C. |
| 2 min | 32.0° C. |
| 2 min 30 s | 33.1° C. |
| 3 min | 34.0° C. |
| 3 min 30 s | 34.9° C. |
| 4 min | 35.6° C. |
| 4 min 30 s | 36.3° C. |
| 5 min | 36.9° C. |
| 6 min | 37.8° C. |
| 7 min | 38.4° C. |
| 8 min | 38.7° C. |
| 9 min | 39.3° C. |
| 10 min | 39.4° C. |
| 11 min | 39.9° C. |
| 12 min 16 s | 40.2° C. |
| 15 min 38 s | 40.4° C. |
| 29 min 48 s | 41.0° C. |

It is shown in Table. 2, the temperature of the heating pad can be slowly risen to a value range under a small power input. The temperature of the heating pad can be kept in the range for a period.

In another embodiment, a voltage of 24 V and a current of 4.29 A are applied on the heating pad. A conduction period and a temperature of the heating pad are tested under a room temperature of 25.6° C. The results are shown in table 3 as follows:

TABLE 3

| Conduction period | Temperature of the heating pad |
| --- | --- |
| 0 s | 25.5° C. |
| 30 s | 27.9° C. |
| 60 s | 33.2° C. |
| 1 min 30 s | 38.4° C. |
| 2 min | 42.8° C. |
| 3 min | 50.8° C. |
| 4 min | 56.0° C. |
| 5 min | 59.9° C. |
| 6 min | 61.4° C. |
| 7 min | 63.0° C. |
| 16 min | 66.6° C. |
| 17 min | 67.2° C. |

It can be clearly seen from Table 3 that the greater the power, the greater the rising speed of the temperature of the heating pad, and the higher the temperature of the heating pad.

The structure of the heating pad used in the heatable seat is not limited, and the contact resistance between the electrodes and the carbon nanotube layer can be less than or equal to 0.3 Ohms Thus, the temperature of the heating pad can be rapidly raised and kept stable at a selected temperature.

The heatable seat includes the heating pad having the following advantages. First, the carbon nanotube layer and the flexible substrate have an excellent flexibility, thus, the heating pad is a flexible heating pad, and the heatable seat can have a long life. The contact resistance between the carbon nanotube layer and the electrodes is small, thus, the work power of the heating pad is small, and the increasing speed of the temperature of the heating pad is large, as such, the temperature of the heatable seat can rise quickly.

Figure 9:
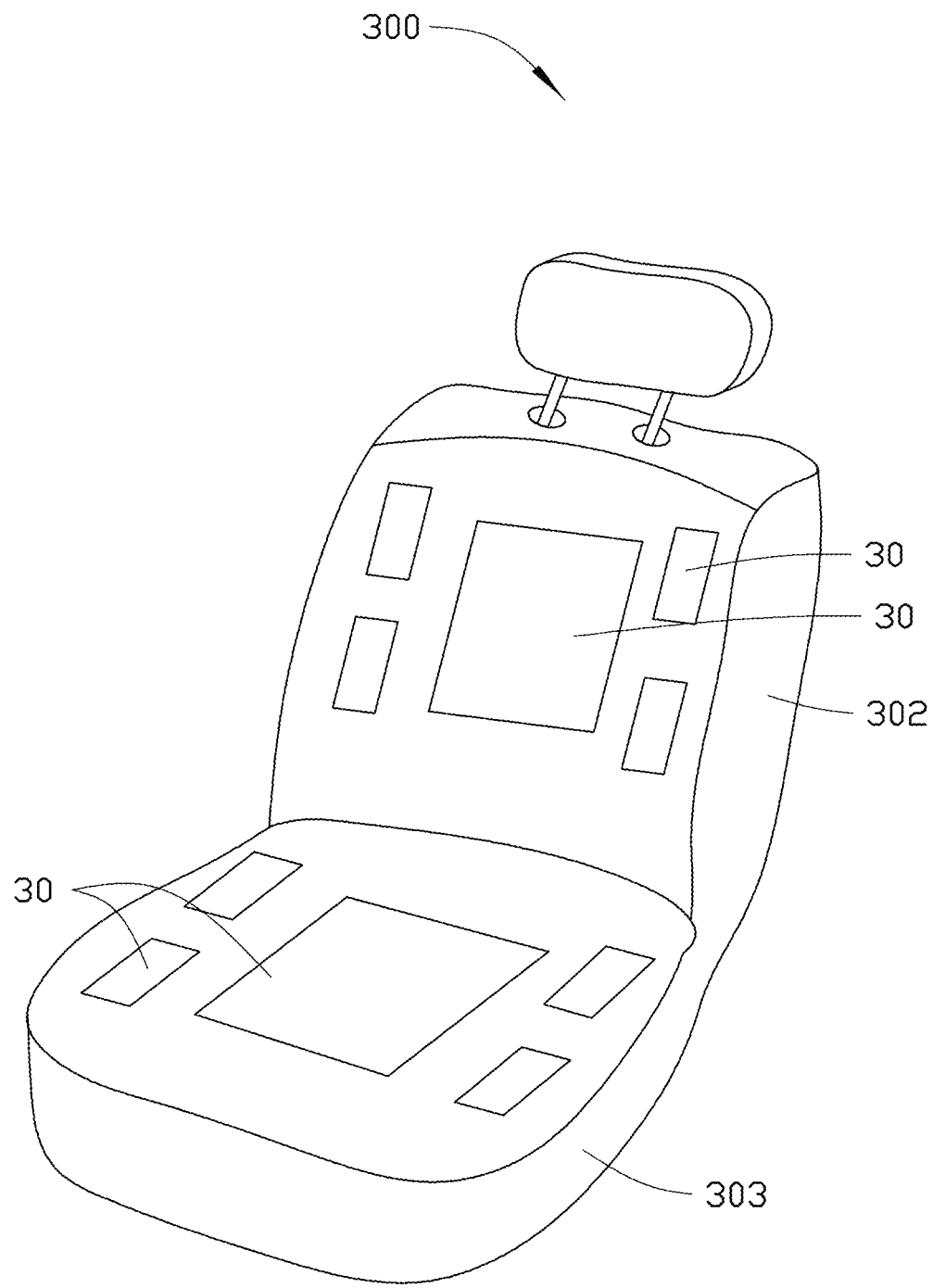
FIG. 9 shows a partial three-dimensional cross-section schematic view of yet another embodiment of a heatable seat.

Referring to FIG. 9, a heatable seat 300 according to yet another embodiment is provided. The heatable seat 300 includes a plurality of heating pads 30. In the embodiment according to FIG. 9, there are ten heating pads 30 located in the heatable seat 300. Five heating pads 30 are located in the back 302, the other five heating pads 30 are located in the bottom 303. Of the five heating pads 30 located in the back 302, one heating pad 30 is larger than the other four heating pads 30. The four smaller heating pads 30 are located around the bigger heating pad 30. The smaller heating pads 30 are located around the bigger heating pad 30. The heating pads 30 can be turned on or turned off selectively in order to control the temperature of the heatable seat 300.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:
1. A heatable seat comprising:
a back;
a bottom connected with the back;
a heating pad in at least one of the back and the bottom, the heating pad comprising:
a heating element comprising a flexible substrate and a carbon nanotube layer fixed on the flexible substrate;

a plurality of first electrodes; and
a plurality of second electrodes;
wherein the heating element has a first end and a second end opposite to the first end, the first end comprises a plurality of first strip structures, the second end comprises a plurality of second strip structures, each of the plurality of first electrodes clamps each of the plurality of first strip structures and is electrically connected with the plurality of first strip structures in one to one manner, and each of the plurality of second electrodes clamps each of the plurality of second strip structures and is electrically connected with the plurality of second strip structures in one to one manner.

2. The heatable seat of claim 1, wherein the plurality of first electrodes and the plurality of second electrodes are metal insert springs, each of the metal insert springs is inserted into each of the plurality of first strip structures and each of the plurality of second strip structures, and each of the metal insert springs is fixed on each of the plurality of first strip structures and each of the plurality of second strip structures.

3. The heatable seat of claim 1, wherein the plurality of first electrodes are separated from each other along a thickness direction of the heating element, and the plurality of second electrodes are separated from each other along a thickness direction of the heating element.

4. The heatable seat of claim 1, wherein the plurality of first electrodes are electrically connected with each other by conductive wires, and the plurality of second electrodes are electrically connected with each other by conductive wires.

5. The heatable seat of claim 1, wherein contact resistances between the plurality of first electrodes and the carbon nanotube layer, and between the plurality of second electrodes and the carbon nanotube layer are less than or equal to 0.3 Ohm.

6. The heatable seat of claim 1, wherein the contact resistances between the plurality of first electrodes and the carbon nanotube layer, and between the plurality of second electrodes and the carbon nanotube layer are equal to about 0.1 Ohm.

7. The heatable seat of claim 1, wherein the flexible substrate and the carbon nanotube layer are stacked with each other.

8. The heatable seat of claim 1, wherein each of the plurality of first strip structures forms a portion of the flexible substrate and a portion of carbon nanotube layer, and each of the plurality of second strip structure forms a portion of the flexible substrate and a portion of carbon nanotube layer.

9. The heatable seat of claim 1, wherein the carbon nanotube layer comprises a plurality of carbon nanotube films stacked with each other, and carbon nanotubes in each of the plurality of carbon nanotube films are arranged along a same direction.

10. The heatable seat of claim 1, wherein the carbon nanotube layer comprises a plurality of carbon nanotubes extending from the plurality of first electrodes to the plurality of second electrodes of the heating element.

11. The heatable seat of claim 10, wherein the plurality of carbon nanotubes in the carbon nanotube layer are joined with each other end to end and extend along a direction from the plurality of first electrodes to the plurality of second electrodes.

12. The heatable seat of claim 1, wherein a material of the flexible substrate is selected from the group consisting of silicon rubber, polrvinyl chloride, polytetrafluoroethylene, non-woven, polyurethane, corium, and any combination thereof.

13. The heatable seat of claim 1, wherein a material of the flexible substrate is a heat shrinkage material.

14. The heatable seat of claim 1, wherein the carbon nanotube layer is self-adhesively fixed on the flexible substrate.

15. The heatable seat of claim 1, wherein the carbon nanotube layer is fixed on the flexible substrate by an adhesive layer.

16. The heatable seat of claim 1, wherein the carbon nanotube layer defines a plurality of wrinkles.

17. The heatable seat of claim 16, wherein the carbon nanotube layer comprises carbon nanotubes joined end to end, and the plurality of wrinkles are protuberance formed by bending the carbon nanotubes joined with each other end to end.

18. The heatable seat of claim 16, wherein an extending direction of the wrinkles is crossed with an extending direction of the carbon nanotubes of the carbon nanotube layer.

19. The heatable seat of claim 18, wherein the extending direction of the wrinkles is substantially perpendicular with the extending direction of the carbon nanotubes of the carbon nanotube layer.

20. A heatable seat, comprising:
a back; and
a bottom connected with the back;
a heating pad in at least one of the back and the bottom, the heating pad comprising:
a heating element comprising a flexible substrate and a carbon nanotube layer overlapping with each other, the heating element comprising a first end and a second end opposite to the first end; and
a first electrode disposed on the first end; and
a second electrode disposed on the second end;
wherein a contact resistance between the first electrode and the carbon nanotube layer, and between the second electrode and the carbon nanotube layer is less than or equal to 0.3 Ohm.

* * * * *